United States Patent
Grant et al.

(10) Patent No.: US 10,787,812 B2
(45) Date of Patent: Sep. 29, 2020

(54) CONSTRUCTION SHEATHING AND METHODS OF MAKING AND USING SAME

(71) Applicant: Atlas Roofing Corporation, Meridian, MI (US)

(72) Inventors: Theodore Alan Grant, Muskegon, MI (US); Matthew Richard Cawson, Caledonia, MI (US); Christopher John Kreple, Holland, MI (US); Robert Butkus, Byron Center, MI (US); Robert Michael Dever, Jr., Dorr, MI (US)

(73) Assignee: Atlas Roofing Corporation, Meridian, MS (US)

( * ) Notice: Subject to any disclaimer, the term of this patent is extended or adjusted under 35 U.S.C. 154(b) by 0 days.

(21) Appl. No.: 16/207,500

(22) Filed: Dec. 3, 2018

(65) Prior Publication Data
US 2019/0368195 A1    Dec. 5, 2019

Related U.S. Application Data

(63) Continuation of application No. 15/424,646, filed on Feb. 3, 2017, now Pat. No. 10,174,503.

(51) Int. Cl.
*E04C 2/52* (2006.01)
*B32B 7/05* (2019.01)
(Continued)

(52) U.S. Cl.
CPC ............. *E04C 2/526* (2013.01); *B32B 5/18* (2013.01); *B32B 7/05* (2019.01); *B32B 27/065* (2013.01);
(Continued)

(58) Field of Classification Search
CPC ...... E04B 1/762; E04B 2103/04; B32B 7/045; E04C 2/243; E04D 13/17
(Continued)

(56) References Cited

U.S. PATENT DOCUMENTS

| 3,368,473 A | 2/1968 | Yoshitoshi Sohda et al. |
| 5,104,715 A | 4/1992 | Cruz |

(Continued)

FOREIGN PATENT DOCUMENTS

| DE | 1659326 A1 | 1/1971 |
| DE | 4024860 A1 | 7/1992 |

(Continued)

OTHER PUBLICATIONS

Lstiburek, "Insight Mind the Gap, Eh!", Insight-038, Posted 2010, 222.buildingscience.com.
(Continued)

*Primary Examiner* — Babajide A Demuren
(74) *Attorney, Agent, or Firm* — Nixon & Vanderhye P.C

(57) ABSTRACT

A laminated building sheathing comprises a rigid foam board and a facer. The rigid foam board comprises a drainage pattern formed on a major surface of the foam board. The drainage pattern comprises a drainage channel. The facer is configured to cover the major surface of the rigid form board and to essentially conform to the drainage pattern. The facer is semi-permanently bonded to the drainage channel but permanently bonded to non-channel planar portions of the major surface.

24 Claims, 14 Drawing Sheets

(51) Int. Cl.
  *E04B 1/80* (2006.01)
  *B32B 37/22* (2006.01)
  *B32B 38/06* (2006.01)
  *E04C 2/32* (2006.01)
  *B32B 5/18* (2006.01)
  *B32B 27/06* (2006.01)
  *B32B 27/36* (2006.01)
  *B32B 37/14* (2006.01)
  *B32B 41/00* (2006.01)
  *E04B 1/76* (2006.01)
  *E04C 2/24* (2006.01)
  *E04B 1/62* (2006.01)

(52) U.S. Cl.
  CPC .............. *B32B 27/36* (2013.01); *B32B 37/14* (2013.01); *B32B 37/223* (2013.01); *B32B 38/06* (2013.01); *B32B 41/00* (2013.01); *E04B 1/762* (2013.01); *E04B 1/80* (2013.01); *E04C 2/243* (2013.01); *E04C 2/326* (2013.01); *E04C 2/523* (2013.01); *B32B 2309/10* (2013.01); *B32B 2325/00* (2013.01); *B32B 2419/00* (2013.01); *B32B 2471/00* (2013.01); *E04B 1/625* (2013.01); *E04B 2103/04* (2013.01)

(58) Field of Classification Search
  USPC ........................................................ 52/302.3
  See application file for complete search history.

(56) References Cited

U.S. PATENT DOCUMENTS

| | | | |
|---|---|---|---|
| 6,000,437 A * | 12/1999 | Ponder | F16L 59/026 |
| | | | 138/128 |
| 6,231,927 B1 * | 5/2001 | Ruid | B05D 1/42 |
| | | | 118/123 |
| 8,590,217 B2 * | 11/2013 | Gleeson | E04B 2/707 |
| | | | 52/105 |
| 8,955,278 B1 | 2/2015 | Mills | |
| 9,145,680 B2 | 9/2015 | Carolan | |
| 9,394,696 B2 | 7/2016 | Norwood et al. | |
| 9,469,984 B2 | 10/2016 | Miks et al. | |
| 9,540,806 B2 | 1/2017 | Lasselsberger | |
| 2001/0054263 A1 * | 12/2001 | Coulton | B32B 3/28 |
| | | | 52/199 |
| 2003/0024192 A1 | 2/2003 | Spargur | |
| 2008/0034690 A1 * | 2/2008 | Gartz | E04B 1/70 |
| | | | 52/302.3 |
| 2009/0311495 A1 | 12/2009 | Squires | |
| 2012/0096790 A1 * | 4/2012 | Wilson | E04F 13/0864 |
| | | | 52/302.1 |

FOREIGN PATENT DOCUMENTS

| | | | | |
|---|---|---|---|---|
| EP | 1621696 A3 * | 3/2006 | | E02D 31/02 |
| WO | WO 9007615 A1 | 7/1990 | | |
| WO | WO 2006/058390 A1 | 6/2006 | | |

OTHER PUBLICATIONS

Office Action dated Feb. 5, 2018 in U.S. Appl. No. 15/424,646.
Notice of Allowance dated Aug. 29, 2018 in U.S. Appl. No. 15/424,646.

* cited by examiner

CONSTRUCTION SHEATHING AND METHODS OF MAKING AND USING SAME

This application is a continuation of U.S. patent application Ser. No. 15/424,646, filed Feb. 3, 2017 (pending), which is hereby incorporated by reference herein.

BACKGROUND

I. Technical Field

The present invention relates to rigid exterior insulation sheathings that have been constructed to provide drainage and ventilation for wall cladding while maintaining functional barrier sealing, and methods for preparing and installing the same, and building constructions built using same.

II. Related Art and Other Considerations

Many buildings are constructed to have one or more types of sheathing to attach to and cover components of a frame, such as studs or roof joists, for example. Some types of sheathing take the form of boards, such as plywood boards, oriented strandboard (OSB), or rigid foam boards. The sheathing is typically overlaid by some type of cladding, such stucco, siding, brick, etc.

Rigid foam boards are generally tough, lightweight, and resistant to degradation and have many common uses in building and structural materials, such as, sheathing in the form of rigid foam board exterior insulation. As part of a wall assembly, rigid foam board provides a continual layer of thermal resistance, often in conjunction with other wall layers that are used to perform other functions such as to control air infiltration, bulk water intrusion, water vapor transmission, and resistance to wind pressure. Accordingly, a need has arisen for rigid foam boards that can perform these other wall functions in addition to thermal resistance.

Recently, rigid foam insulation boards have been tested to demonstrate resistance to bulk water intrusion and air passage through the wall. These products rely on the natural skin of the foam board or "facers" laminated to the foam board, in conjunction with edge sealing and penetration flashing, to create barrier assemblies. A facer may be any type of covering, e.g., film, which is secured, e.g., laminated or adhered, to one or both sides of the rigid foam board. The combination of foam board, flexural resistance, and/or facer tension create assemblies that serve as the primary wind barrier of the wall. Bracing technology is now available in the model building codes that negates the need for continual structural sheathing. As a result, walls utilizing rigid foam sheathing may now be built without use of traditional weather resistant barriers such as #15 asphalt felt or plastic housewrap, and without structural wood sheathing. The rigid foam sheathing controls air, water, thermal resistance, exterior wall water vapor passage, and the transition point of water vapor to liquid.

Unlike #15 asphalt felt paper or plastic housewrap where the layers are overlapped and material is wrapped to avoid penetration, rigid foam sheathing barriers (e.g., water or air) must rely on tape, caulk, edge shaping, and/or flashings to seal intersections of adjoining panels or transitions to windows, doors, roofs, and other parts of the building. Thus the surface of the foam sheathing must be sealable for the system to replace these wrap-type building materials.

Ventilation and drainage of wall systems is often desired or required in climates with high wind & rain conditions or where water sensitive or absorbing cladding is used. The solutions for creating a drainage feature in the market include nailing of furring strips on the wall, special cladding fasteners that create a cavity, special separate building wraps or meshes, or other add-ons during installation. These additional materials add cost, the installation adds cost, and the additional fasteners to install the drainage features promote more opportunity for air and water to leak through the wall.

Stucco cladding systems utilize a water sensitive veneer which wets upon exposure to water and can pass the resulting water and water vapor into the underlying sheathing. Early in the development of the systems, it was observed that this ingress of water must be redirected or else rot inside the wall would occur. To mitigate moisture damage, the model building codes require that a first layer of #15 asphalt felt be installed against the underlying sheathing, followed by a second layer of #15 asphalt felt. During wet plastering of the stucco cladding and subsequent wetting of the underlying layers of felt, the outer layer of felt separates from the inner layer. The resulting drainage layer between the two layers of felt provides a capillary break to relieve hydrostatic pressure against the underlying sheathing, allowing bulk moisture to drain between the layers and for moisture vapor to vent between the layers as well as out the permeable stucco coatings. In this manner, the underlying sheathing is protected from moisture that could cause rot, and the stucco veneer is made more durable by providing drying within the system. Plastic house wraps have been developed that are "pre-wrinkled" to create the same feature of capillary break, drainage, and ventilation.

Flat sheathing products such as structural wood sheathing, gypsum wall board, or rigid foam boards may have spacers installed over the products to create a drainage space between the sheathing and the cladding. These spacers include webbed building wraps, mesh products with hard protrusions, thin wooden or plastic furring strips, or special cladding fasteners such as brick ties. The spacers are installed separately on the wall, exclusive of the wall sealing for water and air infiltration.

Rigid foam board surfaces may be shaped in various ways to create surface features which, like two layers of felt or wrinkled housewrap, promote hydrostatic pressure reduction, drainage, and ventilation of outer layers of cladding or inner layers of moisture sensitive sheathing such as oriented strand board. When these features are incorporated into the rigid foam boards, other means are used to create water barriers in the wall assembly, such as building wraps, since the surface of the rigid foam board is no longer suitable for sealing with tapes. Sealing of joints, penetrations, and transitions to other building enclosure features with caulk or expandable sealant at the edges is prohibitive due to cost and labor requirements, as well as sealant functional deficiency during product curing. A need remains for a rigid foam board that can serve as the water and air barrier within the wall assembly, with sealing at penetrations, joints, and transitions via taping and flashing at the outer surface, while still providing hydrostatic pressure relief, bulk water drainage, and water vapor ventilation between the foam sheathing and the cladding.

BRIEF SUMMARY

In one of its example aspects the technology disclosed herein concerns a laminated building sheathing which comprises a rigid foam board and a facer. The rigid foam board comprises a drainage pattern formed on a major surface of the foam board. The drainage pattern comprises a drainage channel. The facer is configured to cover the major surface of the rigid form board and to essentially conform to the drainage pattern. The facer is semi-permanently bonded to the drainage channel but permanently bonded to non-channel planar portions of the major surface.

In an example embodiment and mode, in a plane perpendicular to the major surface, the drainage channel has an essentially U-shaped cross-sectional surface profile. In being semi-permanently bonded to the drainage channel the facer is bonded to no more than 80% of the cross-sectional surface profile of the drainage channel.

In an example embodiment and mode, in being semi-permanently bonded to the drainage channel the facer is bonded to no more than 50% of the cross-sectional surface profile of the drainage channel.

In an example embodiment and mode in a plane perpendicular to the major surface the drainage channel has an essentially U-shaped cross-sectional shape formed by two channel walls which are essentially perpendicular to the major surface and a channel floor which is essentially parallel to the major surface. In being semi-permanently bonded to the drainage channel the facer is bonded to at least a portion of the channel floor but not bonded to the channel walls.

In an example embodiment and mode in a plane perpendicular to the major surface the drainage channel has an essentially U-shaped cross-sectional shape formed by two channel walls which are essentially perpendicular to the major surface and a channel floor which is essentially parallel to the major surface, and wherein the two channel walls have a length in a range of from 1/16 inch to 5/16 inch and the channel floor has a length of from 1/8 inch to 3/8 inch.

In an example embodiment and mode the facer has a thickness in a range of from 0.0008 to 0.005 inches.

In an example embodiment and mode a semi-permanent bonding force between the drainage channel and a portion of the facer that overlies the drainage channel is less than a de-bonding force caused by sealant which is applied to bridge a gap between a drainage channel formed at an edge of the sheathing and a building element which is adjacent the edge of the sheathing.

In an example embodiment and mode the sealant acquires an orientation that is within 20 degrees of being parallel to the major surface of the foam board.

In an example embodiment and mode the facer comprises an adhesive-backed plastic film.

In another of its example aspects the technology disclosed herein concerns a method of making a laminated building sheathing. In a basis mode the method comprises: forming a drainage pattern on a rigid foam board; and covering the rigid foam board with a facer and essentially conforming the facer to the drainage pattern by semi-permanently bonding the facer to the drainage channel but permanently bonding the facer to non-channel planar portions of the major surface of the rigid foam board.

In an example embodiment and mode the method further comprises laminating the facer to the rigid form board.

In an example embodiment and mode the method further comprises controlling a lamination parameter for semi-permanently bonding the facer to the drainage channel.

In an example embodiment and mode the lamination parameter comprises at least one of duration of lamination pressure, cure time of adhesive activated by the lamination, pattern of application of adhesive.

In an example embodiment and mode the method further comprises controlling size of the drainage channel for semi-permanently bonding the facer to the drainage channel.

In an example embodiment and mode the method further comprises forming the drainage channel whereby in a plane perpendicular to a major surface the drainage channel has an essentially U-shaped cross-sectional shape formed by two channel walls which are essentially perpendicular to the major surface and a channel floor which is essentially parallel to the major surface, and controlling size of the drainage channel comprising forming the two channel walls to have a length in a range of from 1/16 inch to 5/16 inch and forming the channel floor to have a length of from 1/8 inch to 3/8 inch.

In an example embodiment and mode the method further comprises controlling a characteristic of the facer for semi-permanently bonding the facer to the drainage channel.

In an example embodiment and mode the method further comprises controlling a thickness of the facer so that the facer has a thickness in a range of from 0.0008 to 0.005 inches.

In an example embodiment and mode the method further comprises controlling size of the drainage channel and controlling a facer characteristic for semi-permanently bonding the facer to the drainage channel.

In an example embodiment and mode the acts of (1) forming the drainage pattern on the rigid foam board and (2) covering the rigid foam board with the facer are performed essentially simultaneously.

In an example embodiment and mode the act of (1) forming the drainage pattern on the rigid foam board is performed before the act of (2) covering the rigid foam board with the facer, and the method further comprises applying pressure in act (2) whereby the non-channel planar portions of a major surface of the rigid form board experience greater compression than the drainage channel and thereby permanently bonding the facer to non-channel planar portions of the major surface of the rigid foam board but semi-permanently bonding the facer to the drainage channel.

In an example embodiment and mode the method further comprises applying pressure in act (2) whereby the non-channel planar portions of the major surface of the rigid form board are compressed essentially to a same depth as the drainage channel.

In an example embodiment and mode the rigid form board comprises compressive resistance in a range from 5 psi to 25 psi at 10% deformation per ASTM D1621.

In an example embodiment and mode the method further comprises treating the drainage channel to cause the semi-permanently bonding of the facer to the drainage channel.

In an example embodiment and mode the method further comprises applying a substance in the drainage channel which interferes with adhesion of the facer in the drainage channel and thus results in semi-permanently bonding the facer to the drainage channel.

In an example embodiment and mode the method further comprises forming the drainage pattern on the rigid foam board by selectively adding material to the rigid form board.

In another of its example aspects the technology disclosed herein concerns a building construction comprising a building frame, a laminated building sheathing secured to the building frame, and a building element adjacent to the laminated building sheathing, and a sealant. The laminated building sheathing comprises: a rigid foam board comprising a drainage pattern formed on a major surface of the foam board, the drainage pattern comprising a drainage channel at an edge of the laminated building sheathing; and, a facer configured to cover the major surface of the rigid form board and to essentially conform to the drainage pattern. The facer is semi-permanently bonded to the drainage channel but permanently bonded to non-channel planar portions of the major surface. The sealant is applied to bridge a gap between the drainage channel formed at an edge of the sheathing and the adjacent building element. The sealant is configured to exert a de-bonding force to overcome the semi-permanent bonding force between the facer and the drainage channel.

In an example embodiment and mode the sealant is temporarily deformable upon initial application to dip into the drainage channel but is not permanently deformable so that after initial application the sealant in the gap acquires an orientation not conforming to the drainage channel.

In an example embodiment and mode the sealant is temporarily deformable upon initial application to dip into the drainage channel but is not permanently deformable so that after initial application the sealant in the gap is essentially within 20 degrees of being parallel to the major surface of the rigid form board.

In an example embodiment and mode the sealant comprises sealing tape comprising: a minimum thickness of 0.002 inch; a minimum adhesive peel strength of 40 oz/inch per ASTM D3330; and an elongation per ASTM D3759 of no greater than 200%.

In an example embodiment and mode the building element is a frame of a door or a window comprising the building construction.

In an example embodiment and mode the building element is an adjacent laminated building sheathing comprising the building construction.

In another of its example aspects the technology disclosed herein concerns a method of constructing a building. In a basic mode the method comprises securing a laminated building sheathing to a frame of the building and applying a sealant to bridge a gap between the laminated building sheathing and an adjacent building element. The laminated building sheathing comprises a rigid foam board and a facer. The rigid foam board comprises a drainage pattern formed on a major surface of the foam board. The drainage pattern comprises a drainage channel. The facer is configured to cover the major surface of the rigid form board and to essentially conform to the drainage pattern. The facer is semi-permanently bonded to the drainage channel but permanently bonded to non-channel planar portions of the major surface. When applied, the sealant exerts a de-bonding force at a drainage channel formed at an edge of the laminated building sheathing and the adjacent building element which overcomes the semi-permanent bonding force between the facer and the drainage channel and thereby the sealant forms a seal between the laminated building sheathing and the adjacent building element.

In an example embodiment and mode the sealant is temporarily deformable upon initial application to dip into the drainage channel but is not permanently deformable so that after initial application the sealant in the gap acquires an orientation not conforming to the drainage channel within 20 degrees of parallel to the major surface of the foam board.

In an example embodiment and mode the sealant comprises a sealing tape comprising: a minimum thickness of 0.002 inch; a minimum adhesive peel strength of 40 oz/inch per ASTM D3330; and an elongation per ASTM D3759 of no greater than 200%.

In an example embodiment and mode the building element is a frame of a door or a window comprising the building construction.

In an example embodiment and mode the building element is an adjacent laminated building sheathing comprising the building construction.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
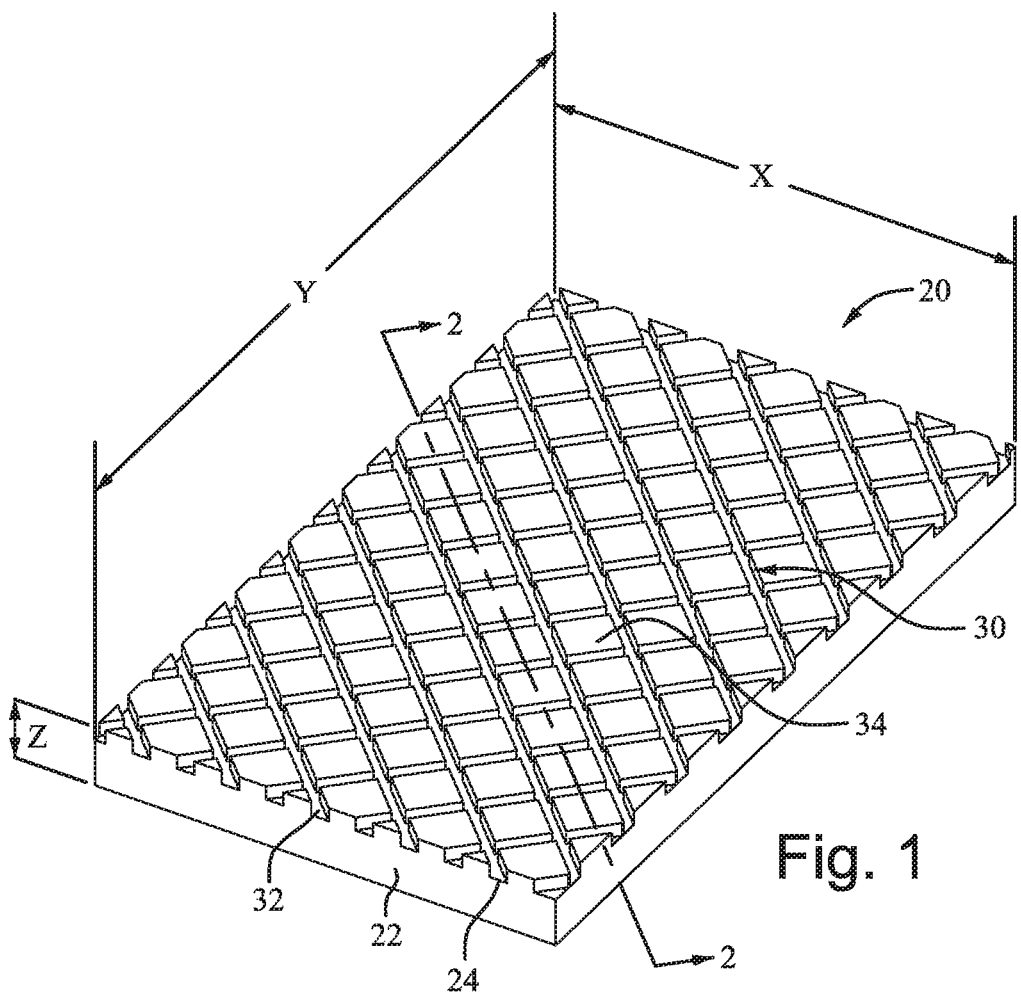
FIG. 1 is perspective view of a laminated building sheathing according to a non-limiting example embodiment.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It must also be noted that as used herein and in the appended claims, the singular forms "a", "an", and "the" include plural reference unless the context clearly dictates otherwise. Thus, for example, reference to a "board" is a reference to one or more boards and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. Nothing herein is to be construed as an admission that the invention is not entitled to antedate such disclosure by virtue of prior invention.

Aspects of the technology disclosed herein include the structure of new laminated building sheathing; a method of making the new laminated building sheathing; a building construction which utilizes the new laminated building sheathing; and a method of installing the new laminated building sheathing. Example embodiments and modes described herein may generally include rigid foam board; surface modifications on one or both faces to provide drainage properties; lamination with at least one film facer; manufactured products made from such rigid foam board, surface modification, and film facer; sealing of such products to each other and other wall components to create water and air barriers; and methods for producing the products. The rigid foam board products of embodiments may provide resistance to thermal energy, water, water vapor, water pressure, air, and air pressure either as a single feature or any combination of these features. These and other aspects are described below with reference to representative, example embodiments and modes.

Figure 2:
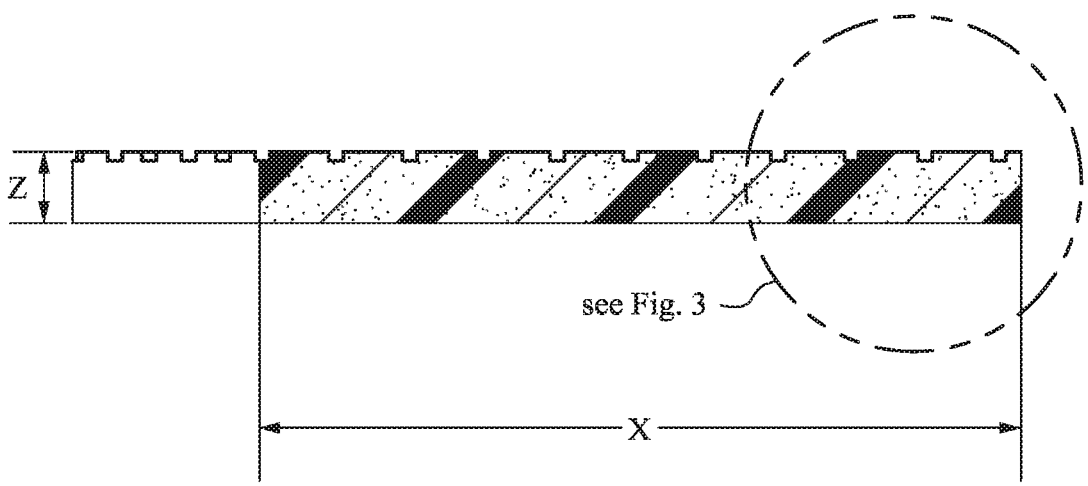
FIG. 2 is a sectioned view of the laminated building sheathing taken along line 2-2 of FIG. 1.
Figure 3:
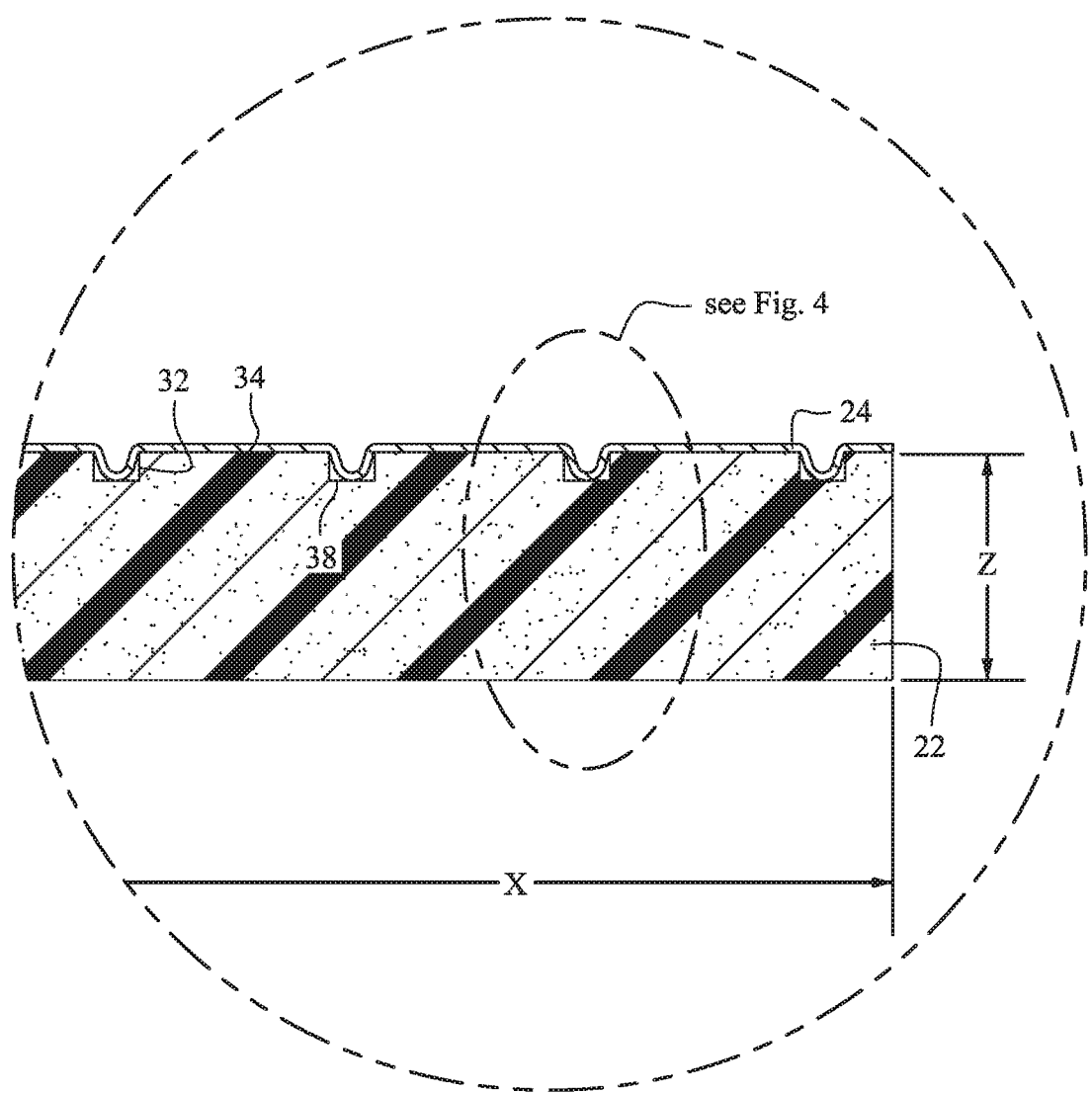
FIG. 3 is an enlarged view of a portion of FIG. 2.
Figure 4:
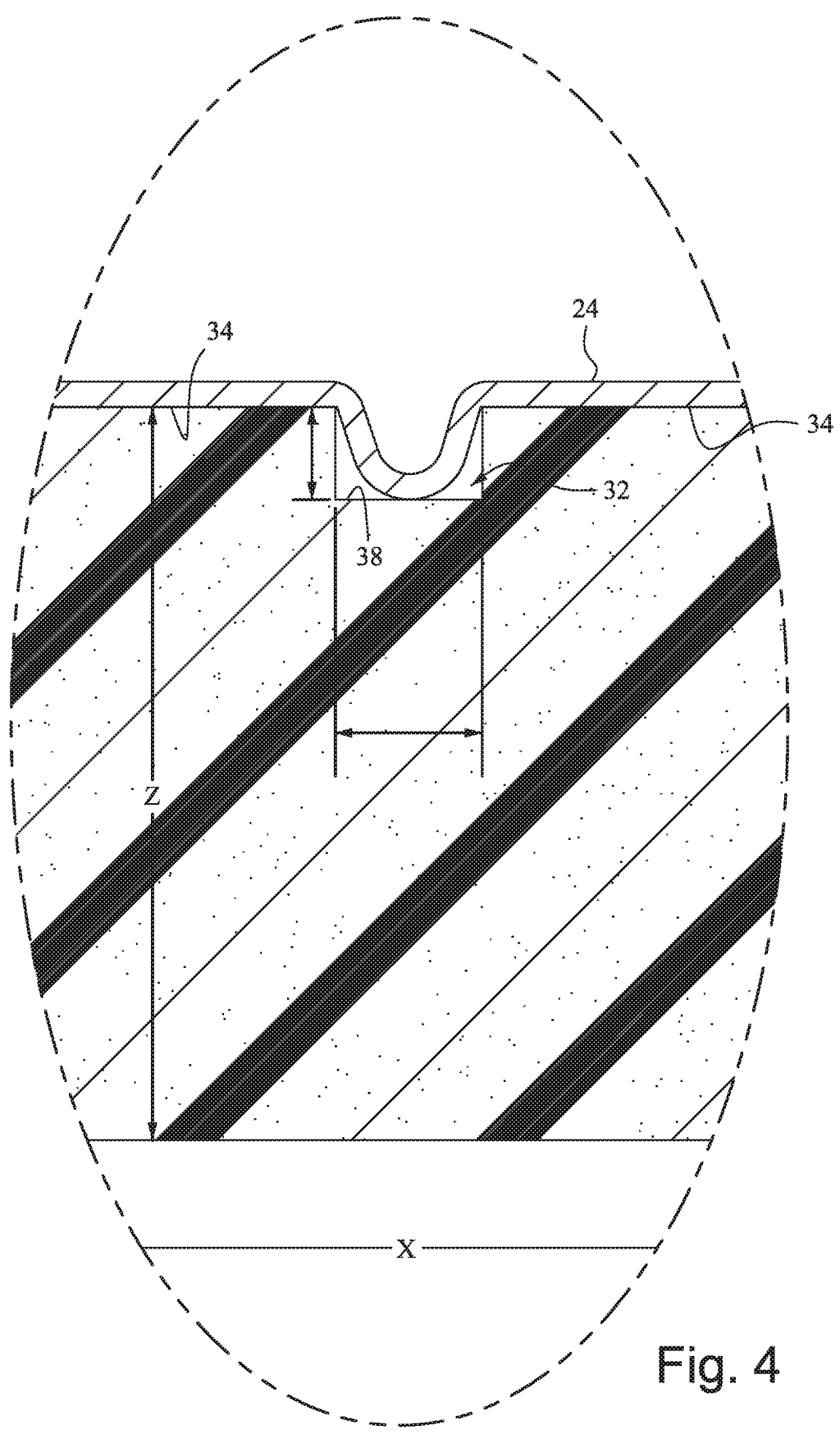
FIG. 4 is an enlarged view of a portion of FIG. 3.

FIG. 1, FIG. 2, and FIG. 3 show a representative panel or board of laminated building sheathing 20 according to an example embodiment and mode of the technology disclosed herein. The laminated building sheathing 20, sometimes referred to herein as "sheathing", comprises rigid form board 22 which is overlaid by facer 24. The laminated building sheathing 20, and the rigid form board 22 and facer 24 comprising the sheathing, have a three dimensional rectangular shape, extending in the X, Y, and Z directions as shown in FIG. 1.

As used herein, generic reference to laminated building sheathing 20 includes both the laminated building sheathing 20 of FIG. 1 and FIG. 2.

The "rigid form board" of example embodiments and modes described herein and/or encompassed hereby may generally include foam boards manufactured using expanded polystyrene (EPS), extruded polystyrene (XPS), polyisocyanurate (PIR), phenolic foam, or other foam boards with compressive resistance exceeding 5 psi at 10% deformation. For example, EPS rigid foam boards provide an economical, functional, and ecological foam board option.

The facer 24 may be chosen from any number of materials, including but not limited to hard foil, Kraft paper, Kraft/foil composites, coated glass facer, polyethylene film, polypropylene film, metalized polypropylene, polyester film, ABS, HIPS, PVC, woven plastics, non-woven wraps, asphalt felt, or other proprietary engineered facers available in the market. For the example embodiment and mode of FIG. 1, either one or both faces of the rigid board 22 may have facer 24 applied. The facer 24 can cover the entire face of the rigid foam board 22, or the facer 24 can extend past the width or length edge or edges of the product. The facer 24 may be applied or adhered to rigid form board 22 using any number of application technologies, such as lamination, adhesive application including continuous coating applications or spot adhesive or any variation of adhesive application pattern. Any adhesive that is chemically compatible with rigid foam board may be used. As described herein, in an example embodiment and mode heat activated polymer adhesive on one side of a laminate (e.g., facer 24) with thickness of one half to two mil polymer adhesive thickness creates sufficient bond to adhere to rigid foam board 22.

The rigid form board 22 has a major surface in a plane of the X direction and Y direction, and a thickness in the Z direction. The major surface of rigid form board 22, which is overlaid by facer 24, has drainage pattern 30 formed on its major surface. The drainage pattern 30 comprises at least one but preferably plural drainage channels 32.

The drainage pattern 30 may be any suitable pattern, one example being illustrated in FIG. 1 and FIG. 1 as a pattern of drainage channels 32 which extend diagonally across rigid form board 22. The drainage channels 32 illustrated in FIG. 1 and FIG. 1 extend in the X-Y plane and have a depth in the Z direction. The drainage channels 32 of FIG. 1 and FIG. 1 have channel major axes that are angularly inclined with respect to the X and Y directions. Some of the drainage channels 32 have a positive slope with respect to the Y direction, while others of the drainage channels 32 have a negative slope with respect to the Y direction. Adjacent drainage channels 32 of the same slope are parallel to one another and essentially equally spaced across the laminated building sheathing 20A, so that the drainage pattern 30 has an overall criss-cross configuration to form plural diamond-shaped plateaus 34 on the major surface of rigid form board 22. An example drainage pattern 30 may result in plateaus 34 of about 1" flat surface diamonds with about ¼" wide channels surrounding each, at about ⅛" depth.

The facer 24 is configured to cover the major surface of the rigid form board 22 and to essentially conform to the drainage pattern. Since the facer 24 is covering rigid form board 22, FIG. 1, FIG. 2 and FIG. 3 actually show the drainage pattern 30 being replicated in facer 24, but such replication provides an understanding of how the drainage pattern 30 is also formed in rigid form board 22.

The particular criss-cross configuration of the drainage pattern 30 of FIG. 1 and FIG. 1 with the resultant diamond shaped plateaus 34 is just one, non-limiting example of a drainage pattern 30. Other drainage patterns, such as parallel but not criss-crossing drainage channels 32, or even a pattern forming circular or elliptical plateaus 34, are possible and encompassed hereby.

The facer 24 is said to essentially conform to the drainage pattern 30 in that the same pattern of the underlying rigid form board 22 is replicated in facer 24. However, as described herein, facer 24 is semi-permanently bonded to the drainage channels 32, but permanently bonded to non-channel planar portions of the major surface of rigid form board 22, e.g., the facer 24 is permanently bonded to the plateau regions in the plane of the major surface of rigid form board 22.

The facer 24 being "semi-permanently bonded" to the drainage channels 32 may be expressed in several ways and has several consequences. For example, the facer 24 is less functionally adhered to the drainage channels 32 than to the major surface of rigid form board 22, as may occur by a desired inferior adhesion or lamination of facer 24 in the drainage channels 32. A consequence of the facer 24 being semi-permanently bonded is that a bonding force of the facer 24 to the drainage channel 32 can be overcome so that the facer 24 can be plucked from the drainage channel 32 as herein described.

Example ways in which facer 24 may be semi-permanently bonded to the drainage channels 32 are illustrated in FIG. 2 and shown in more detail with respect to an enlarged view of a drainage channel 32 in FIG. 3. As shown in FIG. 2 and FIG. 3, the drainage channels 32 have essentially a U-shape. The drainage channels 32 are said to have essentially the shape of the letter U since channel sidewalls 36 are essentially at ninety degree angles (plus or minus 5 degrees) with respect to the major surface of rigid form board 22 and to channel floor 38. Thus, as shown in FIG. 2, and FIG. 3, in the X-Z plane which perpendicular to the major surface the drainage channel (e.g., perpendicular to the X-Y plane), the drainage channel 32 has an essentially U-shaped cross-sectional surface profile. In an example embodiment and mode, in being "semi-permanently bonded" to the drainage channel 32 the facer 24 is bonded to no more than 80% of the cross-sectional surface profile of the drainage channel, and preferably is bonded to no more than 50% of the cross-sectional surface profile of the drainage channel. By "cross-sectional surface profile of the drainage channel" is meant the length of the two channel sidewalls 36 and the channel floor 38 of the drainage channel 32 in the X-Z plane.

In the particular example embodiment and mode shown in FIG. 3, the facer 24 loops or dips into contact with a portion of the drainage channel 32, e.g., into contact with channel floor 38, rather than being adhered to the total length of the cross-sectional profile of the drainage channel 32. Thus, in one non-limiting sense the facer 24 being semi-permanently bonded may include the facer 24 being bonded to at least a portion of the channel floor 38 but not bonded to the channel walls 36. In other example embodiments and modes, however, some adherence of the facer 24 to the channel sidewalls 36 may be permitted.

As discussed herein, in some example embodiments and modes parameters of the facer 24 and of the drainage channels 32 affect and facilitate the facer 24 being semi-permanently bonded to the drainage channels 32. For example, preferably the facer is a plastic, adhesive-backed facer (the adhesive backing being overlaid on the 22) and has a thickness in a range of from 0.0008 to 0.005 inches. Preferably the channel sidewalls 36 have a length in a range of from 1/16 inch to 5/16 inch and the channel floor 38 has a length of from 1/8 inch to 3/8 inch.

Moreover, as described herein, a semi-permanent bonding force between the drainage channel 32 and a portion of the facer 24 that overlies the drainage channel 32 is less than a de-bonding force caused by sealant which is applied to bridge a gap between a drainage channel formed at an edge of the sheathing and a building element which is adjacent the edge of the sheathing.

Figure 5:
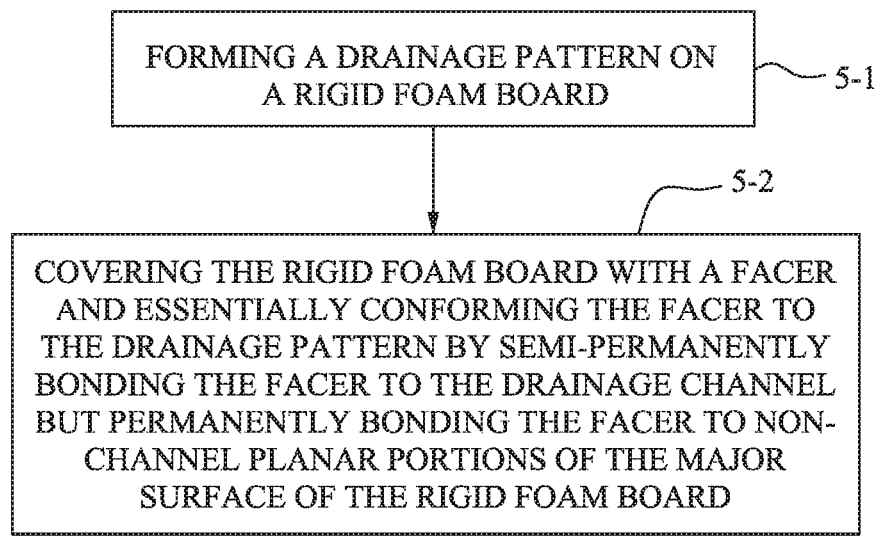
FIG. 5 is a flowchart showing basic, representative, acts or steps comprising a generic method of making a laminated building sheathing according to example embodiments and modes.

FIG. 5 shows basic, representative, acts or steps comprising a generic method of making a laminated building sheathing according to example embodiments and modes of the technology disclosed herein. Act 5-1 comprises forming a drainage pattern on a rigid foam board, e.g., forming the drainage pattern 30 on rigid form board 22. Act 5-2 comprises covering the rigid foam board 22 with facer 24 and essentially conforming the facer 24 to the drainage pattern 30 by semi-permanently bonding the facer to the drainage channel 32 but permanently bonding the facer 24 to non-channel planar portions of the major surface of the rigid foam board 22.

Act 5-1 is the act of forming the drainage pattern 30 on rigid form board 22, which is also known herein as "surface modification" of rigid form board 22. The surface modification or act of forming the drainage pattern 30 may be performed according to various techniques. "Surface modification" or forming of drainage pattern 30 as used herein may generally include an outer surface that is substantially treated to create surface irregularities that allow drainage and ventilation of the intervening space between the rigid foam sheathing and installed cladding. In some embodiments, a surface pattern may be mechanically or thermally carved out of the otherwise flat rigid foam board surface to create relative high and low channels for separating cladding from the surface and providing drainage and ventilation space.

In other embodiments, substances may be added to the flat surface of the rigid foam board to create relative high and low channels for separating cladding from the surface and providing drainage and ventilation space. In still other embodiments, the otherwise flat surface of the rigid foam board may be embossed using heat or pressure to create relative high and low channels for separating installed cladding from the surface and providing drainage and ventilation space. The composition of the added material to create raised drainage features may comprise hardening plastic applied in molted form in any pattern that supports gravity drainage of water and ventilation of water vapor between the surface of the rigid insulation board and the wall cladding. The composition of the plastic can be such that at joints and interfaces to other wall components where sealing is desired, the plastic can be easily removed with a common paint scraper, and the facer selected durable enough to withstand the mechanical abrasion of the scraper. In this embodiment the product once again includes insulation, water barrier, air barrier, drainage, and ventilation in a single unit that can be taped to create continuous function by selectively defeating the drainage feature Shaping the rigid foam board surface may occur through any method known in the art. For example heated wires, heated plates, lasers, and heated shapes are known to melt EPS and XPS and can be used to cut away extraneous foam plastic or imprint shapes or melt the surface of the polystyrene via radiation. Mechanical cutting devices can rout, drill, or sand the surface of rigid foam boards much the same as used for wood products. Water jets can cut into the rigid foam board to create desired shaping. Platens with shapes can be compressed into the rigid foam board surface and provide patterned surface much the same as performed for metal stamping. In some example embodiments and modes, surface embossing channels into polystyrene boards via a heated compression roll as part of a linear lamination process may be efficient, but alternatively the shaping or forming of drainage pattern 30 may occur by a separate process whereby single rigid foam boards are stamped, cut, routed, or melted.

Surface addition of substance to the rigid foam boards may occur through any method known in the art. For example adhesive may be applied to the surface and solid materials dropped on as commonly performed with stone aggregate added to asphalt shingles. Many solid materials may be used, one economical selection readily available to the rigid foam board manufacturers being puffed EPS beads. Another example is melted plastic or other liquid applied in non-continuous raised surface pattern that cools or cures hard to provide a drainage affect in the resulting intervening spaces. Still another example is solids of an adhesive relation to the rigid foam board that may be applied large enough size to create intervening drainage surface and remain adhered to the surface.

Act 5-2 comprises covering the rigid foam board 22 with facer 24 and essentially conforming the facer 24 to the drainage pattern 30 by semi-permanently bonding the facer to the drainage channel 32 but permanently bonding the facer 24 to non-channel planar portions of the major surface of the rigid foam board 22. One particular example, non-limiting technique for performing act 5-2 comprises lamination of facer 24 to rigid form board 22. By way of non-limiting example, FIG. 6A illustrates an example configuration of equipment that may be utilized for lamination of facer 24 on rigid form board 22, and thus also generically represents aspects of a lamination process for implementing act 5-2 in some example embodiments and modes.

Figure 6A:
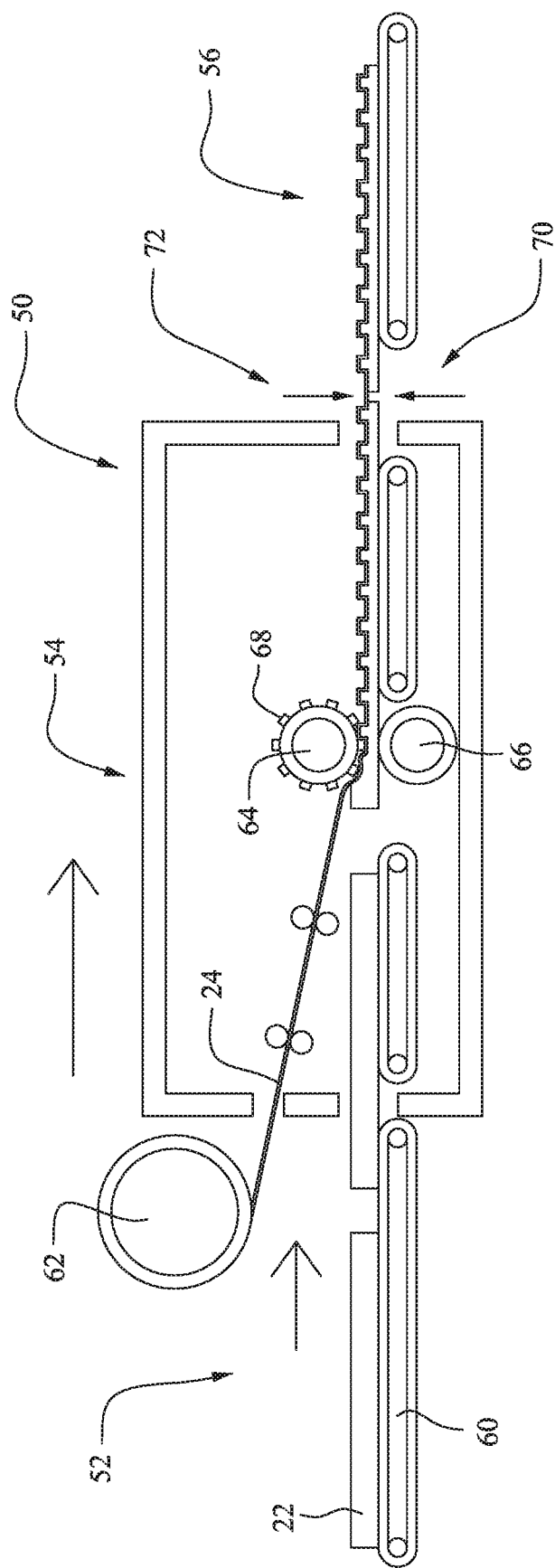
FIG. 6A is a schematic view of example configuration of a first example embodiment and mode of equipment suitable for lamination of a facer onto a rigid form board.

FIG. 6A shows an example laminated building sheathing production line 50 comprising material input section 52; lamination station 54, and output section 56. The material input section 52 comprises input conveyance mechanism 60 for feeding rigid form boards 22 into lamination station 54 and facer material feed roller 62 for feeding facer material into lamination station 54. Preferably the facer 24 is adhesive-backed, but it is also possible to add the adhesive independent of the facer, thereby allowing a wide selection of adhesives (pressure sensitive, urethanes, reactive hotmelt, waterbase, etc).

The lamination station 54, shown in cross section in FIG. 6A, comprises lamination top roller 64 and lamination bottom roller 66 between which the rigid form board 22 is conveyed, with facer material fed to cover rigid form board 22 but under lamination top roller 64. Both lamination top roller 64 and lamination bottom roller 66 serve to nip or compress the combination of rigid form board 22 with overlaid facer material. For example, the nip or compression may be at a pinch pressure of $1/16"$ to $3/16"$ less than the thickness of the rigid form board 22.

In one example implementation the lamination top roller 64 has peripheral contour 68 configured to impart the drainage pattern 30 into the resultant lamination product, and at least the lamination top roller 64 may be heated as well for heat-activated lamination. For the example drainage pattern 30 shown in FIG. 1, for example, the peripheral contour 68 may comprise wire in criss-crossed arrangement wound about the lamination top roller 64. If it is desired to maintain pressure and heat on the composite laminate of rigid form board 22 and facer 24 downstream from the lamination top roller 64, an upper laminator plate or conveyor may be provided above the path of the composite as it travels toward an exit 70 of lamination station 54. Otherwise, the lamination station 54 may be a free-rise laminator as shown. Cutter mechanism 72 may be provided after laminator exit 70 to completely sever the facer material from preceding boards.

When using lamination for covering the rigid form board 22 with facer 24, in an example embodiment and mode the method further comprises controlling a lamination parameter for semi-permanently bonding the facer to the drainage channel. That is, one or more of the following parameters may be controlled for imparting the semi-permanently bonding of facer 24 in the drainage channels 32. Such lamination parameters may include at least one of duration of lamination pressure, cure time of adhesive activated by the lamination, and pattern of application of the adhesive. The lamination station 54 may rely on a combination of coverage and pressure to assure complete adhesion of facer and substrate. By varying the duration of pressure, cure time of adhesive, and pattern of application, it is possible to create the same preferential inferior lamination in the drainage channels according to the technology disclosed herein. As an example, holding a panel under pressure long enough for partial cure of reduced water base adhesive on the flat portion surface while a greater amount of adhesive resides in the channels and not cured (still wet), removing the panel from pressure, and thus allowing the facer to partially rebound from inside the channels with partial bond, and subsequently the panel fully cures with the channels only partially bonded but the flat face fully bonded.

Further, an example implementation of an example embodiment and mode comprises controlling size of the drainage channel for semi-permanently bonding the facer to the drainage channel. For example, controlling size of the drainage channel may comprise forming the two channel walls 36 to have a length in a range of from $1/16$ inch to $5/16$ inch and forming the channel floor 38 to have a length of from $1/8$ inch to $3/8$ inch. Such controlling of drainage channel size may be in conjunction to controlling one or more lamination parameters as above described.

If the drainage channels 32 are very deep, the facer 24 cannot bond into the channels at all. Likewise if the drainage channels 32 are very wide, it will be hard to install flat claddings and to keep the facer from sticking down into the channels, making it hard to seal the joints. If the channels are shaped with gentle sloping edges that mirrored the bending of the facer into the channels, too much surface area would be adhered in the channels and once again it would prove difficult to tape the joints continuously. Thus a size of the drainage channels 32 has been chosen to be in a range of $1/16"$ to $5/16"$ deep, and in a range of $1/8"$ to $3/8"$ wide, of a shape accommodating no more than 80% surface area contact of the facer, preferably 50% surface contact Further, an example implementation of an example embodiment and mode comprises controlling a characteristic of the facer for semi-permanently bonding the facer to the drainage channel. For example, controlling a characteristic of the facer may comprise controlling a thickness of the facer so that the facer has a thickness in a range of from 0.0008 to 0.005 inches. Such controlling of a characteristic of the facer may be in conjunction with one or more of controlling one or more lamination parameters and/or controlling size of the drainage channel, as above described.

Figure 6B:
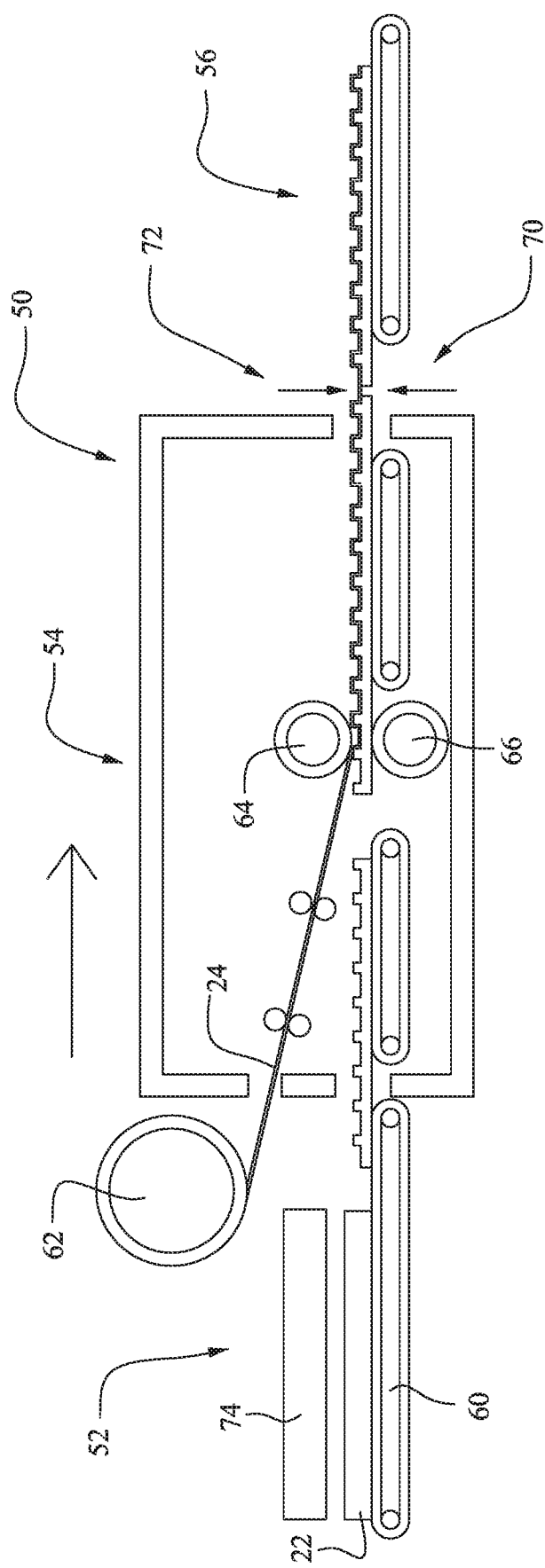
FIG. 6B is a schematic view of example configuration of a first example embodiment and mode of equipment suitable for lamination of a facer onto a rigid form board.

In some implementations of example embodiments and modes act 5-1 and act 5-2 of FIG. 5 are performed essentially simultaneously, as may occur in the example equipment illustrated in FIG. 6A, for example. Yet in other example implementations act 5-1 (forming the drainage pattern 30 in rigid form board 22) may be performed before act 5-2 (the facer 24 covering the rigid form board 22 and conforming to the drainage pattern 30). In such other implementations, the forming of the drainage pattern 30 (act 5-1) may occur upstream from lamination station 54, e.g., in or before material input section 52, as illustrated by drainage pattern formation mechanism 74 in FIG. 6B. In the example embodiments and modes such as FIG. 6B wherein the drainage pattern 30 is applied or formed earlier than application of facer 24, the degree of pressure applied in act 5-2 for covering the rigid form board 22 with the facer 24 may be such that the non-channel planar portions of the major surface of the rigid form board 22, e.g., plateaus 34, experience greater compression than the drainage channel whereby the plateaus 34 are permanently bonded to the facer, but the drainage channels 32 experience less pressure than the plateaus 34 and thereby have the facer 24 only semi-permanently bonded thereto. In fact, in an example implementation, the degree of pressure applied in act 5-2 may be such that the non-channel planar portions of the major surface of the rigid form board, e.g., plateaus 34, are temporarily compressed essentially to a same depth as the drainage channel, e.g., to channel floor 38, but later bounce back. An example of a rigid form board 22 capable of such compression is one having compressive resistance in a range from 5 psi to 25 psi at 10% deformation per ASTM D1621.

Thus, the foam surface of the rigid form board 22 under pressure may compress to the same depth as the drainage channels 32, thereby allowing the facer 24 to remain in plane and contact sheathing (e.g., rigid form board 22) and channel surfaces to somewhat the same degree and same temperature but under different pressure, as the flat surface is under great compression and the channel surface hardly touched. Further, upon exiting the machine the flat surface rebounds and the facer 24 travels with it, while the facer in the intervening channels 32 then experiences tension and starts to partially delaminate for milliseconds prior to full cure of the cooled adhesive layer. This advantageously results in inferior bond in the channels, i.e., the semi-permanently bonding of the facer 24 in the drainage channels 32.

As mentioned above, in some example embodiments and modes, act 5-1 may comprise forming the drainage pattern on the rigid foam board by selectively adding material to the rigid form board. In such other implementations, the forming of the drainage pattern 30 (act 5-1) may occur upstream from lamination station 54, e.g., in or before material input section 52, as illustrated by drainage pattern formation mechanism 74 in FIG. 6B. In such example embodiments and modes, the drainage pattern formation mechanism 74 serves to add or deposit material onto a surface of rigid form board 22 in order to create the plateaus 34.

Figure 7A:
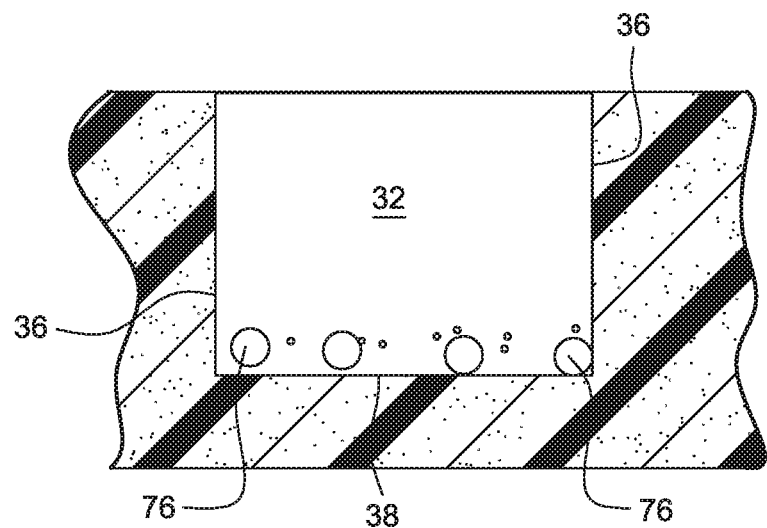
FIG. 7A is a cross sectional view of a rigid form board in which a drainage channel has been treated with a substance to impede facer adhesion.
Figure 7B:
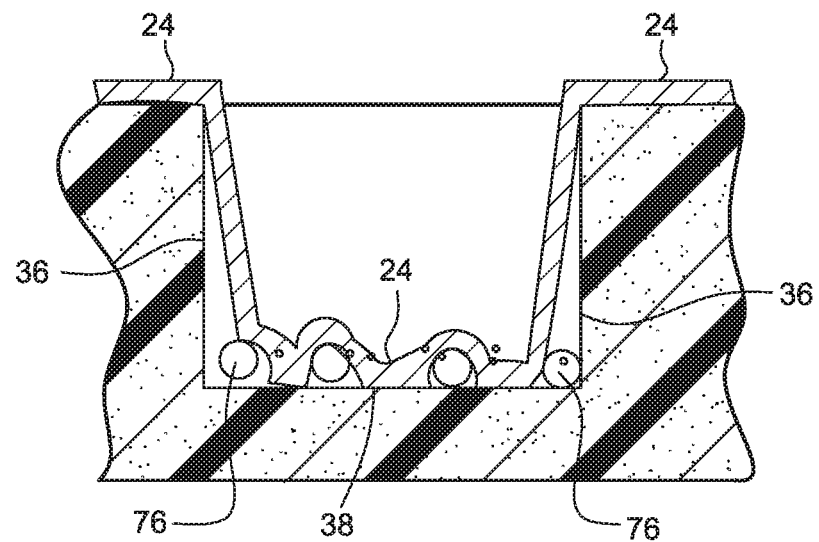
FIG. 7B is a cross-sectional view showing the rigid form board with facer preferentially inferiorly adhered in the drainage channel due to the adhesion impeding substance.

In other example embodiment and modes the semi-permanently bonding of the facer to the drainage channel may result from (pre) treating the drainage channel to cause the semi-permanently bonding of the facer to the drainage channel, as generally illustrated in FIG. 7A and FIG. 7B. For example, act 5-2 may comprise applying a substance in the drainage channel 32 which interferes with adhesion of the facer in the drainage channel and thus results in semi-permanently bonding the facer to the drainage channel. Such substance as applied to the cross-sectional profile of drainage channel 32, e.g., to at least channel floor 38 and possibly channel walls 36, is generically represented as substance 76 in FIG. 7A. FIG. 7B illustrates, in simplified manner, that facer 24 does not adhere as well to the drainage channel 32 as a result of the treatment, e.g., addition of substance 76, as to the non-channel portions of rigid form board 22. The substance 76 may interfere with adhesion in several ways, such as reducing or covering surface area of the drainage channel 32 and thereby precluding adhesion, or chemically interacting with the adhesive backing of the facer 24 to reduce the adhesion properties or capabilities thereof.

Figure 8:
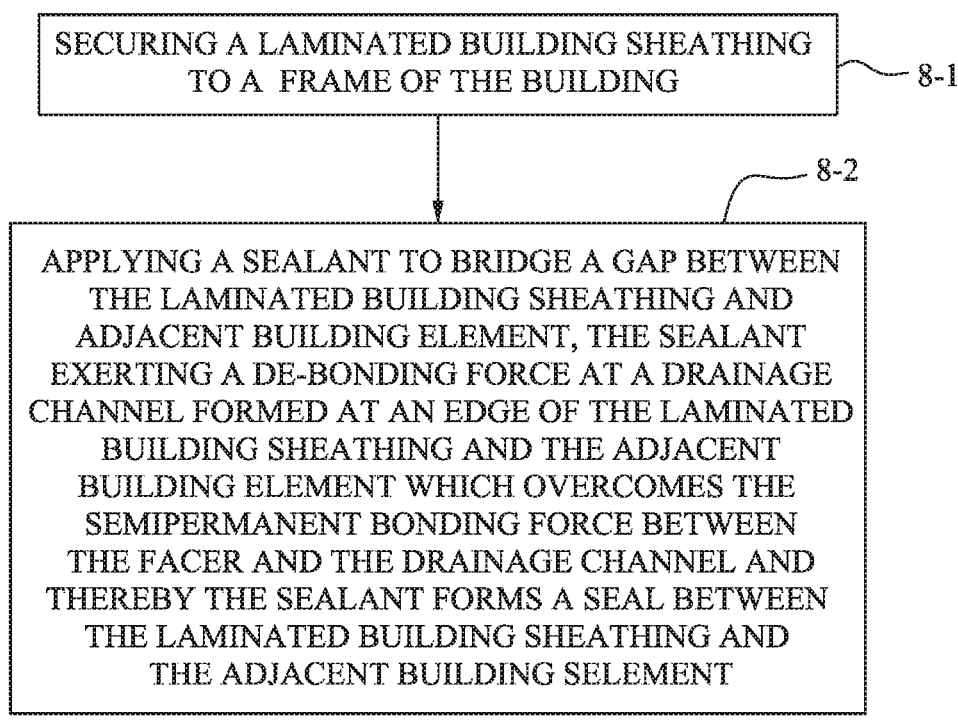
FIG. 8 is a flowchart showing basic, representative, acts or steps comprising a generic method of constructing a building using one or more laminated building sheathings as described herein.
Figure 9A:
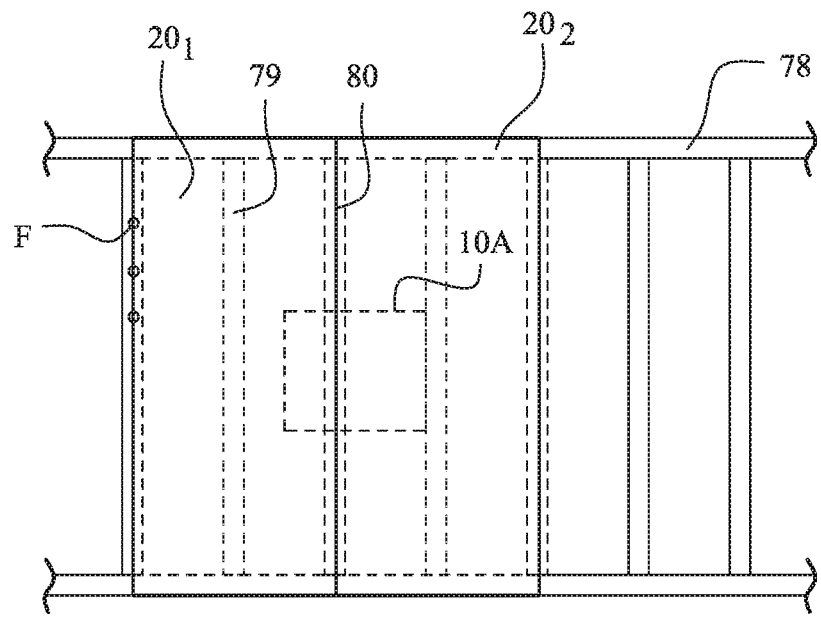
FIG. 9A is a front elevation view of a portion of a building under construction and comprising a first laminated building sheathing and an adjacent building element which takes the form of a second laminated building sheathing and before application of a sealant.

In another of its aspects the technology disclosed herein concerns a method of constructing a building using one or more laminated building sheathings as described herein. Representative, illustrative acts or steps comprising the method are illustrated in FIG. 8. Act 8-1 comprises securing a laminated building sheathing 20 to a frame 78 of the building. As understood from the foregoing, the laminated building sheathing comprises rigid form board 22 with drainage channel 32 formed on a major surface of the foam board and the facer 24 which covers the rigid form board 22 and essentially conforms to the drainage pattern (but is semi-permanently bonded to the drainage channel 32 but permanently bonded to non-channel planar portions of the major surface). FIG. 9A shows a first laminated building sheathing $20_1$ being affixed to building frame 78, and particularly being affixed by fasteners F to vertical studs 79 of frame 78.

Act 8-2 comprises applying a sealant to bridge a gap between the laminated building sheathing and an adjacent building element. As explained herein, the sealant exerts a de-bonding force at a drainage channel formed at an edge of the laminated building sheathing and the adjacent building element which overcomes the semi-permanent bonding force between the facer and the drainage channel and thereby the sealant forms a seal between the laminated building sheathing and the adjacent building element.

Figure 9B:
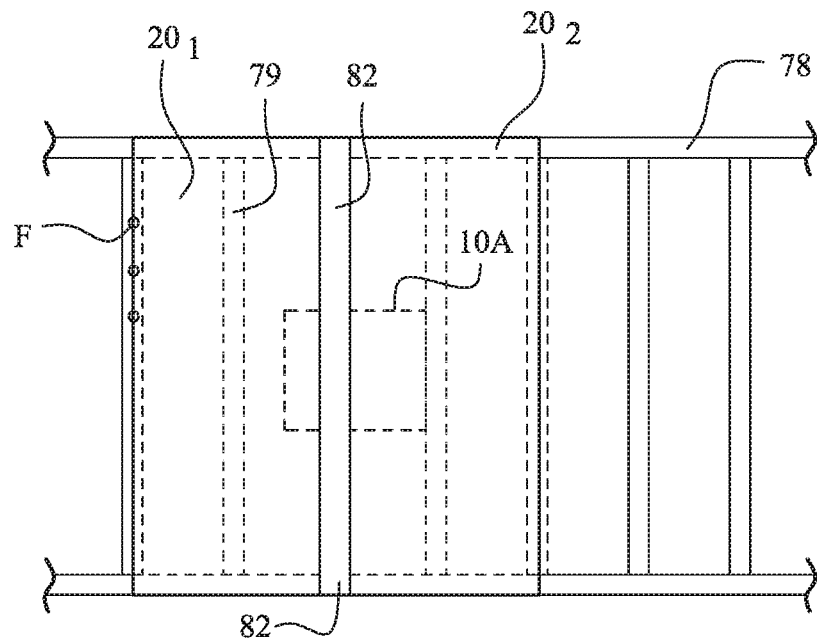
FIG. 9B is a front elevation view of the portion of the building of FIG. 9A after application of a sealant to bridge a gap between the first laminated building sheathing and the second laminated building sheathing.

In the particular example shown in FIG. 9A, the adjacent building element is another laminated building sheathing $20_2$, positioned to abut the first laminated building sheathing $20_1$ as closely as possible, but nevertheless a small gap or crack 80 being formed in view of the discontinuity. Whereas FIG. 9A shows the first laminated building sheathing $20_1$ and the second laminated building sheathing $20_2$ and before application of an adhesive, e.g., sealant, FIG. 9B shows application of a sealant 82 to bridge the gap 80 between the first laminated building sheathing $20_1$ and the second laminated building sheathing $20_2$.

Figure 10A:
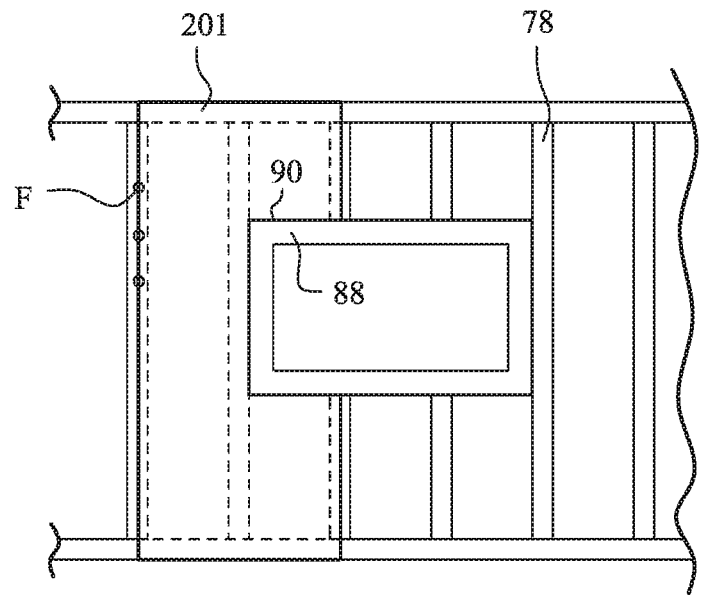
FIG. 10A is a front elevation view of a portion of a building under construction and comprising a first laminated building sheathing and an adjacent building element which takes the form of a window framing and before application of a sealant.
Figure 10B:
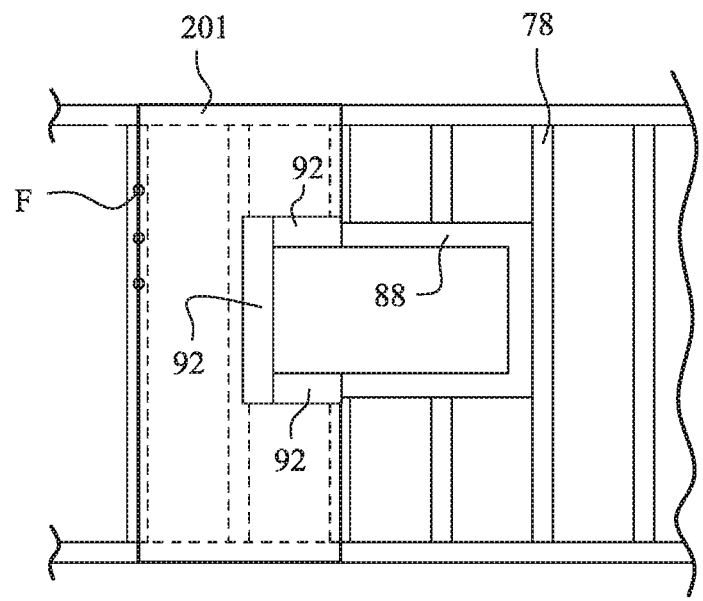
FIG. 10B is a front elevation view of the portion of the building of FIG. 10A after application of a sealant to bridge a gap between the first laminated building sheathing and the window framing.

In the particular example shown in FIG. 10A, the adjacent building element is window framing 88, and the laminated building sheathing $20i$ may be cut or otherwise configured to abut the window framing 88 as closely as possible, but nevertheless a small gap or crack 90 is formed in view of the discontinuity. Whereas FIG. 10A shows the first laminated building sheathing $20_1$ and the window framing 88 and before application of a sealant, FIG. 10B shows application of a sealant 92 to bridge the gap 90 between the first laminated building sheathing $20_1$ and the window framing 88. The window framing 88 is merely exemplary of other types of building elements, as the building element could be of a similar type (e.g., door framing) or another type.

It should be understood that, as used herein, an "edge" of the laminated building sheathing may not be a natural original edge as formed with the board, but instead an edge that is formed by cutting or other preparation for alignment with the adjacent building element, e.g., with window framing 88.

Figure 11A:
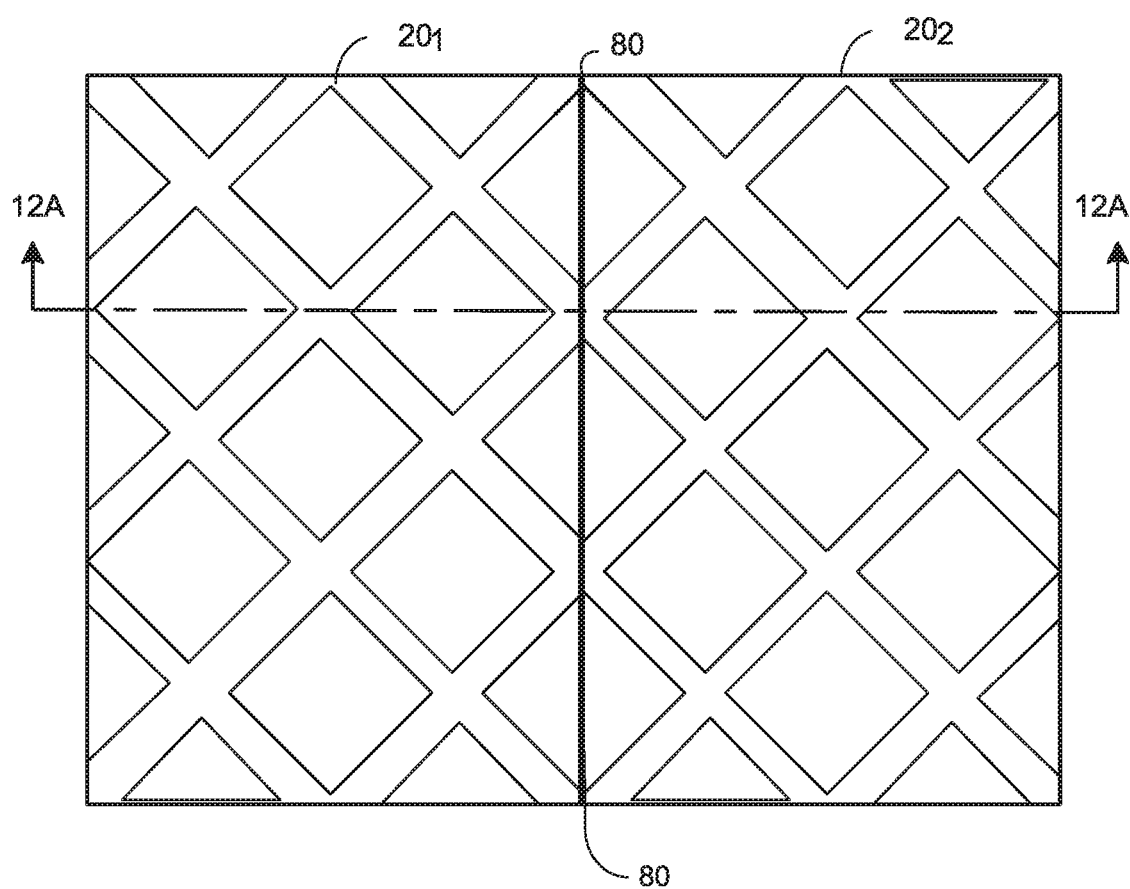
FIG. 11A is a plan view of an enlarged portion of FIG. 9A before application of sealant.
Figure 12A:
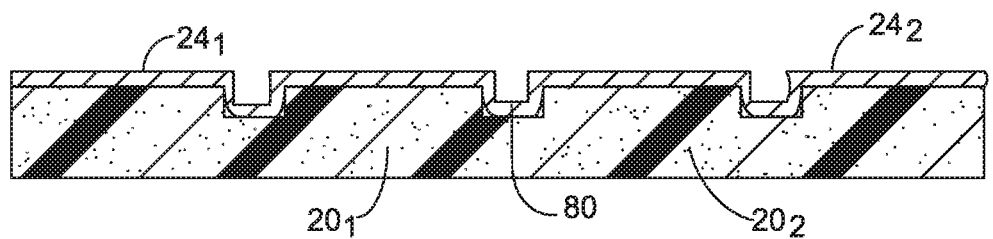
FIG. 12A is a sectioned view taken along line 12A-12A of FIG. 11A.

FIG. 11A shows an enlarged portion of the two laminated building sheathings 201 and 202 positioned side-by-side in the manner of FIG. 9A with the gap 80 therebetween before application of sealant 82. FIG. 12A is a sectioned view taken along line 12A-12A of FIG. 11A, also showing both laminated building sheathing $20_1$ and laminated building sheathing $20_2$ as well as gap 80. As will be seen in FIG. 12A, at the edges of the two laminated building sheathings $20_1$ and $20_2$ at gap 80 the respective facers $24_1$ and $24_2$ conform to the drainage pattern 30, e.g., are adhered to drainage channel 32 (although only semi-permanently bonded to drainage channel 32, as opposed to the facers 24 being permanently bonded to non-channel portions of the laminated building sheathings).

Figure 11B:
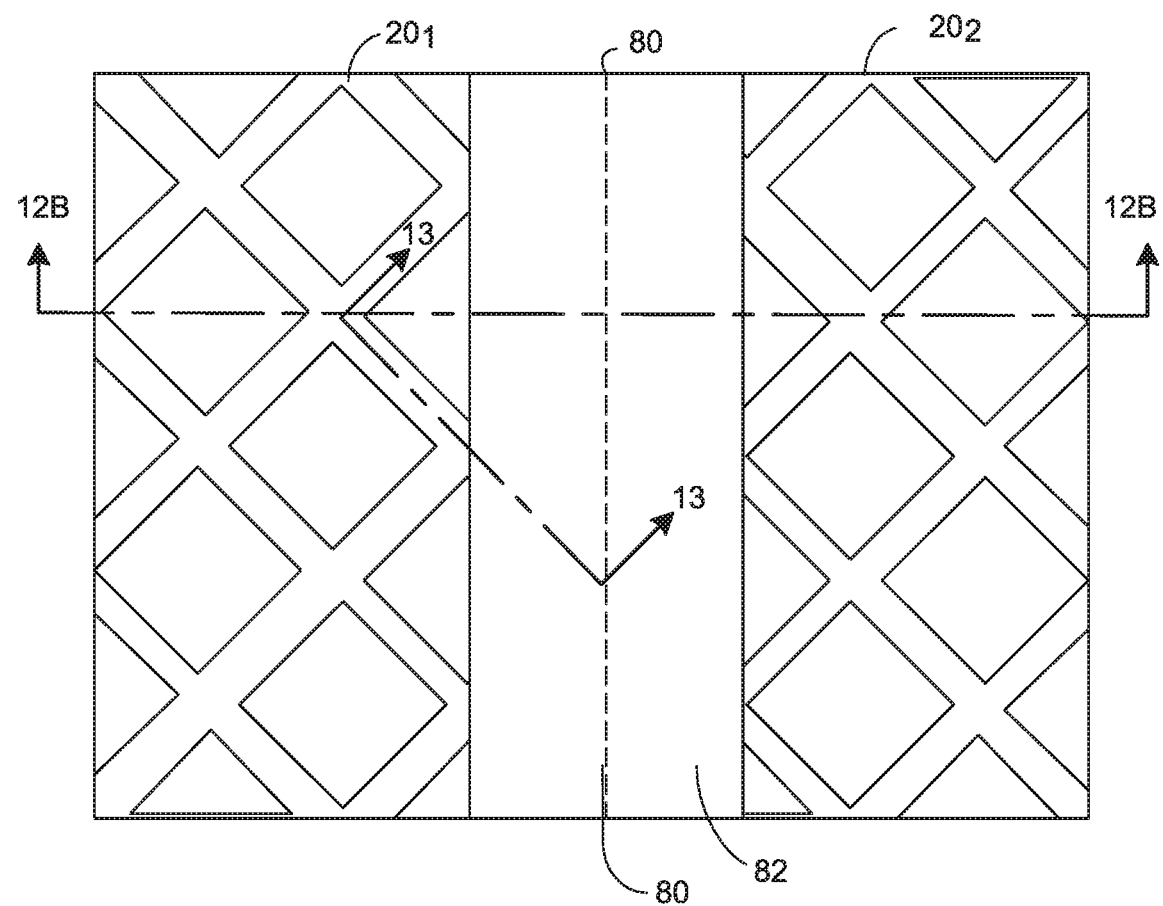
FIG. 11B is a plan view of an enlarged portion of FIG. 9B after application of sealant.
Figure 12B:
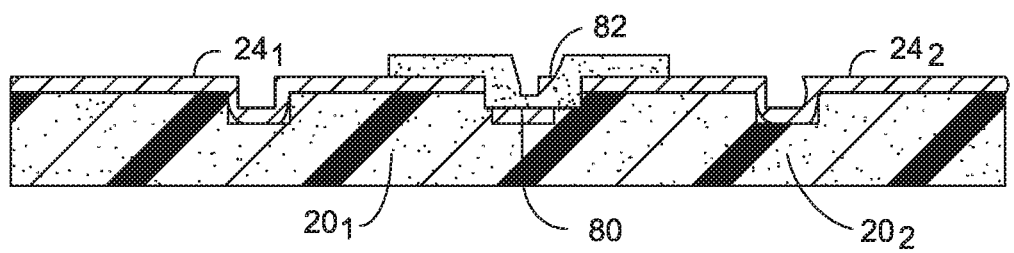
FIG. 12B is a sectioned view taken along line 12B-12B of FIG. 11B immediately after application of sealant and wherein the sealant initially deforms in a drainage channel; and, FIG. 12C is a sectioned view taken along line 12B-12B of FIG. 11B immediately after the sealant has deflected to a position not conforming to a drainage channel.
Figure 12C:
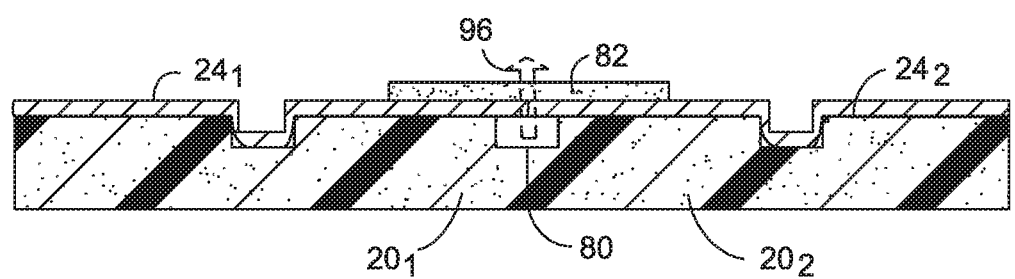
Figure 13:
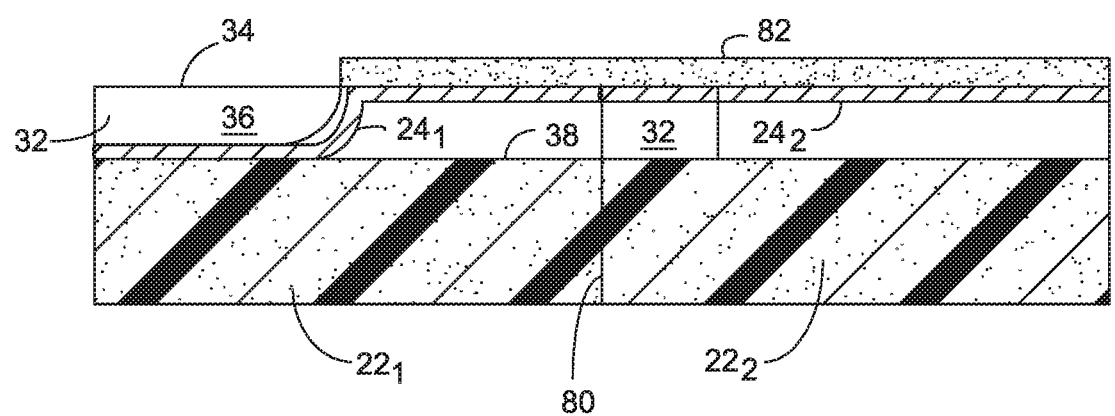
FIG. 13 is a sectioned view taken along line 13-13 of FIG. 11B.

FIG. 11B and FIG. 12B show the same enlarged portion depicted in FIG. 11A, but immediately after application of sealant 82. Whereas initially the sealant 82 also takes the contour of the drainage pattern 30, e.g., dips down into the drainage channels 32 covered by sealant 82, the properties of the sealant 82 are such that the sealant 82 cannot retain the contour of the drainage pattern 30, and almost immediately deflects back and out of the drainage channel 32. That is, the sealant 82 is temporarily deformable upon initial application to dip into the drainage channel (as shown in FIG. 12B), but is not permanently deformable so that after initial application the sealant in the gap acquires an orientation not conforming to the drainage channel, e.g., not conforming to the rectangular cross-sectional profile of the drainage channel 32 as defined by channel walls 36 and channel floor 38 (as shown in FIG. 12C). In fact, in a preferred example embodiment and mode the sealant 82 acquires a planar orientation as shown in FIG. 12C. In deflecting back out of the drainage channel 32, in the neighborhood of the drainage channel 32 the sealant 82 exerts a de-bonding force on facer 24 (illustrated by arrow 96 in FIG. 12C) which overcomes the semi-permanently bonding of the facer 24 to the drainage channel 32, so that the facer 24 in the neighborhood of the drainage channel 32 also acquires the orientation of the sealant 82, e.g., preferably a planar orientation. Whereas FIG. 12B shows the final orientation of the facer 24 with respect to and view of a drainage channel 32, e.g., across a narrow width direction of a drainage channel 32, FIG. 13 shows the final orientation of the deflected facer 24 with respect to a major direction (length) of the drainage channel 32, showing that along the length of the drainage channel 32 the facer 24, under position and attraction of the sealant 82, rises from the channel floor 38 in view of the counter-bonding force 96 exerted by sealant 82.

The defection of the facer 24 in the neighborhood of the drainage channel 32 results from the fact that, in at least some example embodiments and modes, before sealing the facer 24 was adhered into the drainage channels 32, but not perfectly so, e.g., not perfectly following the channel profile or not as strongly bonded into the drainage channels 32. For example, in some example embodiments and modes the facer 24 may adhere to the center of the drainage channel 32, but not to the edges or channel walls 36. When the shape of drainage channel 32 has a square edge, the facer 24 may loop down into the channel to adhere only part of the entire available surface area towards the center. This partial adhesion of facer to channel allows the sealant 82 to grab the facer 24 and pull the facer 24 out of the drainage channel 32, returning the facer 24 to a sealing orientation, e.g., flat with the rest of the sheet of foam.

After deflection of the sealant 82 and facer 24 back to the flat orientation in the neighborhood of the drainage channel 32, the sealant 82 is in continuous contact with the facer 24, which is precisely what a seal requires. Elsewhere, where the sealant 82 is not applied, the facer 24 otherwise stays looped down into the drainage channels 32, creating paths on which water travels down the face of the sheathing to avoid hydrostatic pressure in the wall assembly. By using a drainage pattern 30 such as a diamond pattern, the drainage works whether the panel is installed vertical or horizontal.

In an example embodiment and mode, sealant 82 (shown in FIG. 9A and FIG. 11B) and sealant 92 (shown in FIG. 10B) are a sealing tape. An example such sealing tape preferably has a minimum thickness of 0.002 inch; a minimum adhesive peel strength of 40 oz/inch per ASTM D3330; and an elongation per ASTM D3759 of no greater than 200%, and preferably no greater than 130%.

In view of the foregoing, it will be appreciated that another aspect of the technology disclosed herein concerns a building construction which comprises a building frame (such as frame 78), a laminated building sheathing 20 according to one or more of the example embodiments and modes described herein, a building element adjacent to the laminated building sheathing; and, a sealant applied to bridge a gap between the drainage channel formed at an edge of the sheathing and the adjacent building element. As described above, the sealant is configured to exert a de-bonding force to overcome the semi-permanent bonding force between the facer and the drainage channel. The buildings constructions encompassed by the technology disclosed herein include but are not limited to the configurations illustrated in FIG. 9A/FIG. 9B and FIG. 10A/FIG. 10B.

As explained above, the combination of laminated facer and surface drainage feature (e.g., drainage pattern 30) may occur separately or in the same process, or with either the lamination of facer or the creation of drainage feature occurring before the other. In an example embodiment and mode in which the drainage feature is created by shaping the surface of the rigid foam board to create drainage channels, the lamination of facer may be preferred after or during the shaping of the rigid foam surface. In example embodiments and modes wherein another surface is added or bonded to the rigid foam board to create intervening drainage channels, lamination of the facer may be preferred before or after addition of the surface material. In this manner, a finished product surface may be created that is comprised of a laminate that follows the irregular surface of the underlying shaped rigid board (thus laminate is adhered after) to promote drainage, or a finished product surface in which the laminate is flat upon the rigid foam board and the protruding additional material resides on the surface of the laminate to create intervening drainage channels In example embodiments and modes in which the laminate facer is applied after the drainage feature is shaped into or added on top of the rigid foam board surface, the selected laminate must be flexible enough to bend into drainage channels and provide a sufficient bond to the rigid foam board. In example implementations a polymer film with thickness one half to three mil is one preferred embodiment of such facer. In the embodiment where a surface protrusion is added to the facer after facer is adhered to the rigid foam board, laminate flexibility is not a consideration.

Sealing edges of the product either to each other or to other wall components to create a water and air barrier assembly may be accomplished through taping, flashing, caulks, or liquid applied coatings. For some example embodiments and modes taping is an economical, robust, and permanent sealing method for the wide range of substrates encountered in a wall assembly.

In example embodiments and modes wherein the laminate (e.g., facer 24) is applied over the drainage feature and has flexibly followed the irregular surface of the drainage channels on the rigid foam board, the tape must bond to the laminate preferentially in that the laminate de-bonds from the underlying rigid foam board shape and results in a continuous in-plane seal of the tape to the laminate In example embodiments and modes wherein the drainage feature is created by adding a material to the surface of the laminate over the rigid foam board, surface sealing may also be conducted using tape. In these embodiments, the combination of the added drainage material and the laminate must be such that the added material may be scraped off to create a flat surface on the laminate to assure a continuous seal with tape.

An example embodiment and mode of a combination of rigid foam board, surface drainage pattern, and laminate has been tested to perform at 98.8% drainage efficiency and allow sealing of same product. This tested embodiment is comprised of polystyrene foam board with one inch by two inch diamond pattern channels heat embossed continuously into one surface one eighth inch deep and one quarter inch wide, covered with surface treated flexible polymer laminate permanently bonded to the flat surface of the diamond shapes and semi-permanently bonded into the drainage channels. Subsequent tape applied to the desired sealing surface of the product at joints, window flanges, and other penetrations permanently bonds to the surface treated flexible polymer laminate, which de-bonds from the drainage channels to create a continuous in-plane seal against air and water intrusion. The polymer laminate remains bonded to the flat surface of the diamond shapes to promote a continuous air and water seal on the wall, and remains bonded into the drainage channels in the remaining field of the wall panels to allow drainage and ventilation.

The technology disclosed herein includes an integral water and air sealant layer that de-bonds from the omnidirectional drainage and ventilation channels and instead bonds in flat planar manner to joint sealing and window flashing tapes. By bringing the water and air sealing layer into a flat configuration upon the rigid insulation board where tape interfaces, a continuous flat seal is achieved at window flanges and adjoining panels. The technology disclosed herein does not require separate coverage of the wall with a water or air barrier building wrap, and it presents the ability to seal using tapes and flashing materials much more common and economical than liquid or spray applied coatings. Further, the long term durability of tapes and flashing materials are well understood, while it is possible that liquid applied sealants, such as is seen with flaking paint, are not long term sealant solutions.

According to one aspect of the technology disclosed herein, by using differences in bond strength between the facer and the rigid board insulation and the joint tape or flashing material, the irregular drainage and ventilation surface of the resulting product can be defeated where desirable to seal joints and material transitions using traditional construction products. In one of its aspects the technology disclosed herein involves a selection of one or more of facer material, pattern, spacing, and depth of surface channels, creation of different adhesion properties within the drainage channels versus the rest of the rigid insulation board surface, adhesion enhanced chemical treatment of the outer surface of the selected facer, and selection of tape and flashing materials which preferably bond to the facer surface to create planar sealing interfaces. One or more of these attributes may be balanced to allow drainage and ventilation features without compromising sealing to adjoining panels or wall components, the possible combinations exceed the embodiments which have been tested thus far.

The material for the facer 24 should not be too rigid, or it will not loop into the drainage channels and the drainage feature is lost. If the facer is too conformable, it might contact too much of the surface area of the channels and prove very difficult to create a continuous seal with tape. So a "sweet spot" must be found with facer rigidity relative to other aspects of the laminated building sheathing 20 and the process of fabrication. Depending on facer material chosen, a facer thickness in a range of 0.8 mil to 5.0 mil total film/adhesive thickness is preferable. The facer may be, for example, a film comprising polyester, polypropylene, polyethylene, or other plastic film.

Care should be taken in the size of the drainage channel 32 relative to other aspects of the lamination/adhesion process. If a channel is too deep, adhesion may be prevented, in which case even without sealant the facer may return to the flat configuration and no longer translated the drainage feature imbedded in the rigid insulation board below. Preferably the facer adheres very well to the face of the rigid insulation board, and adheres well enough to the channels created by heat, is durable enough for the jobsite, water resistant, air impermeable, and able to exhibit the drainage and ventilation feature of the underlying rigid insulation board, and at affordable cost.

But if the channel depth is chosen properly, by using heat to create the channels in the surface the resulting surface in the channels may exhibit sufficient adhesion to for the drainage channels 32 of rigid form board to retain the facer, but relatively less or decreased adhesion to the facer in the drainage channels 32 versus the remaining flat surface of the rigid insulation board. In this manner, the drainage feature is translated through the facer in all manners, except where edges and transitions were taped. In the taped regions, the facer was able to preferentially bond to tape and de-bond from the surface down in the drainage channels.

As discussed, once the concept of creating defeatable drainage features through manipulating attributes of each component is understood, other embodiments become obvious. A facer can be made durable enough that it can survive not only job site handling and long term installation, but also endure reasonably easy mechanical removal of a raised drainage feature.

This invention and embodiments illustrating the method and materials used may be further understood by reference to the following non-limiting example.

Example 1

In the following example the effectiveness the drainage efficiency of one example embodiment was assessed. All tests were carried out in accordance with ASTM E2925 "Standard Specification for Manufactured Polymeric Drainage and Ventilation Materials Used to Provide a Rainscreen Function." Briefly, the test wall sample is covered with a flat board including a slot at the top portion, water is sprayed through the slot, and the amount of recaptured water calculated as percent drainage efficiency.

Test samples were prepared as follows: EPS rigid board was run through a heated roll set upon which a diamond mesh pattern resided. The resulting rigid foam board with one surface heat imprinted with 1"×2" continuous diamond pattern of intersecting channels ⅛" deep by ¼" wide was then processed through a heat treat laminate machine whereby 1.1 mil polyester film was laminated continuously onto the diamond surface.

Test platforms were constructed by creating a mock test wall consisting of 2×4 wood studs at 16" OC sheathed with 7/16" OSB. The test sample was fastened over the OSB using ⅜"D head roofing nails with heads flush to the surface and diamond pattern facing out. The test sample was cut down the center, then the resulting "joint" was sealed with flashing tape to verify seal-ability. Per the ASTM standard, a rigid XPS board was cut to fit the test wall, with a 2"×40" slot cut removed horizontally 12" from the top of the test wall. The XPS was sealed to the test sample perimeter except the bottom.

Water was sprayed into the slot in the XPS against the drainage surface of the test sample at a rate of 237 grams per minute for 15 minutes (3561 grams total) and water collected at the bottom for an additional 60 minutes. At the point that the water spray was turned off at 15 minutes, 3265 grams was collected at the bottom of the assembly (91.7%), and by the end of the test period 3461 grams of water was recaptured. 57 grams was collected from overspray that missed the slot in the XPS. The test revealed 100×(3461)/(3561+57)=98.8% drainage efficiency. No leakage of water was identified through the taped sealed joint in the test panel.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A laminated building sheathing comprising:
   a rigid foam board comprising a drainage pattern formed on a major surface of the foam board, the drainage pattern comprising plural drainage channels,
   a facer configured to cover the major surface of the rigid foam board and bonded to at least a floor portion of at least some of the plural drainage channels of the drainage pattern, a bonding force between the floor portion of the at least some of the plural drainage channels and a portion of the facer that overlies the drainage channel being less than a de-bonding force caused by sealant which is applied to bridge a gap between a drainage channel formed at an edge of the sheathing and a building element which is adjacent the edge of the sheathing.

2. The sheathing of claim 1, whereby the sealant acquires an orientation that is within 20 degrees of being parallel to the major surface of the foam board.

3. The sheathing of claim 1, wherein the facer is not bonded as strongly to the floor portion of the at least some of the plural drainage channels as to the major surface.

4. The sheathing of claim 1, wherein the facer does not perfectly follow a profile of the at least some of the plural drainage channels.

5. The sheathing of claim 1, wherein the facer is partially bonded within the at least some of the plural drainage channels.

6. The sheathing of claim 1, further comprising a substance in the plural drainage channels which interferes with adherence of the facer to the plural drainage channels to result in less than permanent bonding to the plural drainage channels.

7. A method of making a laminated building sheathing comprising:
   (1) forming a drainage pattern on a rigid foam board;
   (2) covering the rigid foam board with a facer and bonding the facer to at least a floor portion of at least some of the plural drainage patterns, a bonding force between the floor portion of at least some of the plural drainage channels and a portion of the facer that overlies at least some of the plural drainage channels being less than a de-bonding force caused by sealant which is applied to bridge a gap between a drainage channel formed at an edge of the sheathing and a building element which is adjacent the edge of the sheathing.

8. The method of claim 7, further comprising laminating the facer to the rigid foam board.

9. The method of claim 8 further comprising controlling a lamination parameter for less than permanently bonding the facer to the plural drainage channels.

10. The method of claim 9, wherein the lamination parameter comprises at least one of duration of lamination pressure, cure time of adhesive activated by the lamination, pattern of application of adhesive.

11. The method of claim 7, further comprising controlling size of the plural drainage channels for less than permanently bonding the facer to the plural drainage channels.

12. The method of claim 7, further comprising forming the plural drainage channels whereby in a plane perpendicular to a major surface the plural drainage channels have an essentially u-shaped cross-sectional shape formed by two channel walls which are essentially perpendicular to the major surface and the channel floor which is essentially parallel to the major surface, and wherein controlling size of the plural drainage channels comprises forming the two channel walls to have a length in a range of from 1/16 inch to 5/16 inch and forming the channel floor to have a length of from 1/8 inch to 3/8 inch.

13. The method of claim 7, further comprising controlling a characteristic of the facer for less than permanently bonding the facer to the plural drainage channels.

14. The method of claim 7, further comprising controlling size of the plural drainage channels and controlling a facer characteristic for less than permanently bonding the facer to the plural drainage channels.

15. The method of claim 7, wherein act (1) and act (2) are performed essentially simultaneously.

16. The method of claim 7, wherein act (1) is performed before act (2), and further comprising applying pressure in act (2) whereby the non-channel planar portions of a major surface of the rigid foam board experience greater compression than the plural drainage channels and thereby permanently bonding the facer to non-channel planar portions of the major surface of the rigid foam board but less than permanently bonding the facer to the plural drainage channels.

17. The method of claim 16, further comprising applying pressure in act (2) whereby the non-channel planar portions of the major surface of the rigid foam board are compressed essentially to a same depth as the plural drainage channels.

18. The method of claim 7, further comprising treating the plural drainage channels to cause the less than permanent bonding of the facer to the plural drainage channels.

19. The method of claim 7, further comprising forming the drainage pattern on the rigid foam board by selectively adding material to the rigid foam board.

20. A building construction comprising:
a building frame;
a laminated building sheathing secured to the building frame, the laminated building sheathing comprising:
  a rigid foam board comprising a drainage pattern formed on a major surface of the foam board, the drainage pattern comprising plural drainage channels including drainage channel at an edge of the laminated building sheathing;
  a facer configured to cover the major surface of the rigid foam board and to essentially conform to the drainage pattern by bonding to at least a floor portion of at least some of the plural drainage channels;
a building element adjacent to the laminated building sheathing;
a sealant applied to bridge a gap between the facer covering the drainage channel formed at an edge of the sheathing and the adjacent building element, the sealant configured to provide a seal at the gap which is flat in the neighborhood of the drainage channel formed at an edge of the sheathing and above the major surface of the foam board.

21. The building construction of claim 20, wherein the sealant is temporarily deformable upon initial application to dip into the drainage channel formed at an edge of the sheathing but is not permanently deformable so that after initial application the sealant in the gap acquires an orientation not conforming to the drainage channel formed at an edge of the sheathing.

22. The building construction of claim 20, wherein the sealant comprises sealing tape comprising:
a minimum thickness of 0.002 inch;
a minimum adhesive peel strength of 40 oz/inch per ASTM D3330; and
an elongation per ASTM D3759 of no greater than 200%.

23. A building construction comprising:
a building frame;
a laminated building sheathing secured to the building frame, the laminated building sheathing comprising:
  a rigid foam board comprising a drainage pattern formed on a major surface of the foam board, the drainage pattern comprising plural drainage channels including a drainage channel formed at an edge of the laminated building sheathing;
  a facer configured to cover the major surface of the rigid foam board and to essentially conform to the drainage pattern, the facer being bonded to at least a floor portion of at least some of the drainage channels of the drainage pattern, a bonding force between the floor of at least some of the drainage channels and a portion of the facer that overlies at least some of the drainage channels being less than a de-bonding force caused by sealant which is applied to bridge a gap between a drainage channel formed at an edge of the sheathing and a building element which is adjacent the edge of the sheathing.

24. A method of constructing a building comprising:
securing a laminated building sheathing to a frame of the building, the laminated building sheathing comprising:
  a rigid foam board comprising a drainage pattern formed on a major surface of the foam board, the drainage pattern comprising plural drainage channels;
  a facer configured to cover the major surface of the rigid foam board and to essentially conform to the drainage pattern, the facer being bonded to at least a floor portion of at least some of the drainage channels of the drainage pattern;
applying a sealant to bridge a gap between the laminated building sheathing and an adjacent building element, the sealant exerting a de-bonding force at a drainage channel formed at an edge of the laminated building sheathing and the adjacent building element formed at an edge of the laminated building sheathing which overcomes a bonding force between the facer and the drainage channel formed at an edge of the laminated building sheathing and thereby the sealant forms a seal between the laminated building sheathing and the adjacent building element.

* * * * *